J. M. DODGE.
PROCESS OF MANUFACTURING CHAIN LINKS.
APPLICATION FILED MAR. 13, 1908.
921,519. Patented May 11, 1909.
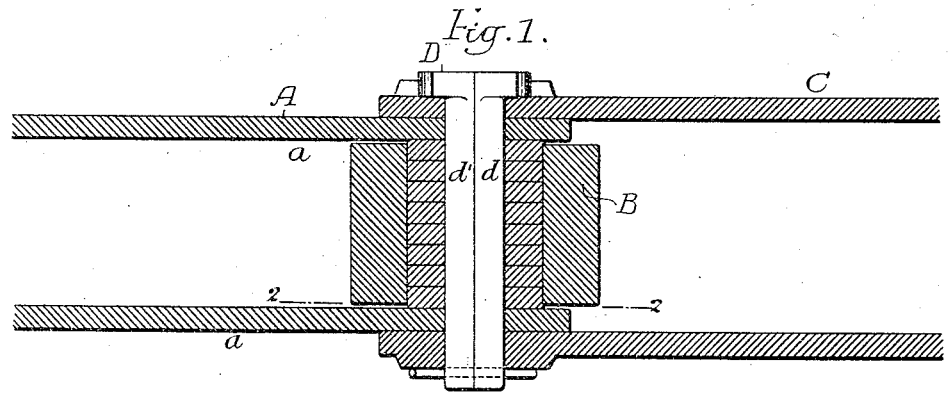
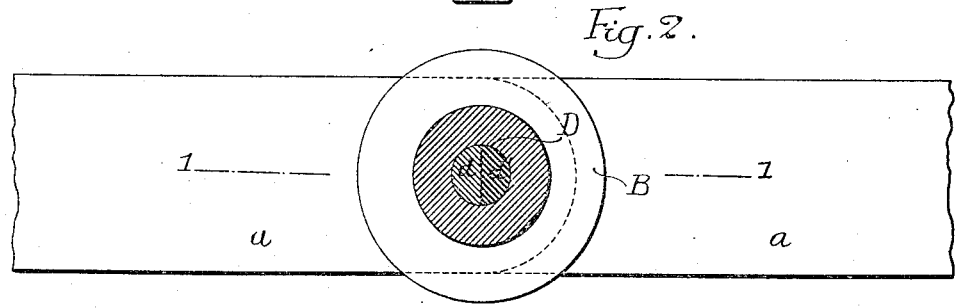
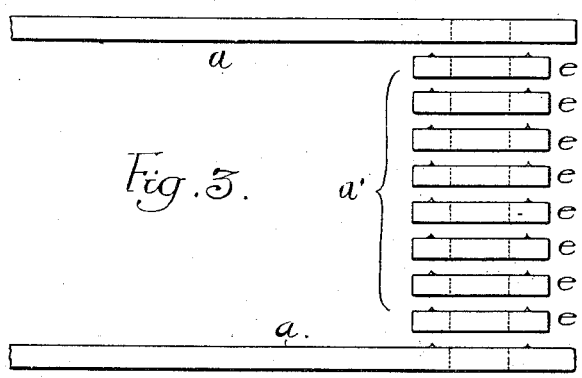
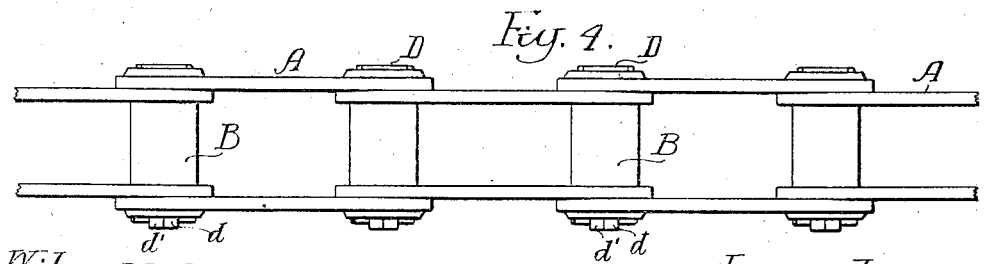
Witnesses:
Augustus B. Coppes
Walter Chism
Inventor—
James M. Dodge.
by his Attorneys,
Howson & Howson

UNITED STATES PATENT OFFICE.

JAMES M. DODGE, OF PHILADELPHIA, PENNSYLVANIA.

PROCESS OF MANUFACTURING CHAIN-LINKS.

No. 921,519.   Specification of Letters Patent.   Patented May 11, 1909.

Application filed March 13, 1908. Serial No. 420,902.

*To all whom it may concern:*

Be it known that I, JAMES M. DODGE, a citizen of the United States, residing in Philadelphia, Pennsylvania, have invented certain Improvements in the Process of Manufacturing Chain-Links, of which the following is a specification.

One object of my invention is to construct a chain link by building it up in sections and securing the sections together by welding, preferably by electric welding, so as to form a single integral unit.

In the accompanying drawing:—Figure 1, is a longitudinal sectional view on the line 1—1, Fig. 2, showing a section of the chain of my improved chain link; Fig. 2, is a longitudinal sectional view on the line 2—2, Fig. 1; Fig. 3, is a view showing the several elements of the link detached; and Fig. 4, is a view of part of a chain made in accordance with my invention.

A is the chain link consisting of side plates $a$, $a$ and an intervening member $a'$ connecting the side plates. Usually this intervening member is made in one piece and is forced into the openings in the side members $a$, $a$. This method of manufacture, however, weakens the link at the eyes so that to obtain the proper strength the links have to be increased in size at each end. By my invention I secure the intervening member to the sides of the side plates by welding so that the hole in the side plates $a$, $a$ is of the same diameter as the hole in the intervening member, thus it is not necessary to increase the size of the link at this point. I preferably make the intervening member of a number of sections $e$, Fig. 3, and which are punched from a plate and can be readily assembled when it is desired to weld the parts together. In the event of electric welding I preferably form any number of small projections on the members $e$ so that there will be a point contact and then one part can be readily welded to another by electric welding until the chain link is built up as shown. If a roller B is to be mounted upon the chain link then before the last section of the link is welded to the others the roller is slipped into position and the last section welded. In some instances the roller B may be made in two parts and welded together; the link can then be completely finished and the roller applied afterward.

C, C are two links which are attached to the link A in the ordinary manner by the pin D which passes through openings in the several links and may be fastened in place by a cotter pin or other suitable fastening. I preferably make the pin D in two parts $d$, $d$ and one of these parts is preferably harder than the other; the two parts being welded together so as to make a one part pin with a hardened portion which is so situated as to take the wear. The construction of the pin is fully set forth and claimed in a divisional application filed March 2nd, 1909, under Serial No. 480,981. The pin is preferably prevented from turning in the links C in any suitable manner when it is made in two parts as shown, so as to present the hardened surface to receive the pressure of the link A.

It will be understood that there can be as many sections $e$ as desired, and in some instances the intervening member $a'$ instead of being made up in sections $e$ may be only a single piece welded to the two side members $a$, $a$.

By the above described construction I can make a very substantial link having the same strength as the ordinary link and economizing in the use of metal, as the welding of the intervening member to the sides of the link reinforces the sides, making a very substantial construction.

The parts can be readily and cheaply assembled so that a link made in accordance with my invention will be as economical, considering the strength, as any link now in use.

I claim:—

1. The process herein described of manufacturing a chain link, said process consisting in first making two side members and then perforating them, punching a series of elements to form an intervening section, then assembling the several sections, and welding the parts together to form a unitary structure.

2. The process herein described of making a chain link, said process consisting in making two side members and perforating them, then punching and forming a series of elements to produce an intervening member, uniting one of said elements to the side section by welding, building up a central section by adding the series of punched elements one at a time, and finally uniting the other side sections to the built up intervening member.

In testimony whereof, I have signed my name to this specification, in the presence of two subscribing witnesses.

JAMES M. DODGE.

Witnesses:
 WM. A. BARR,
 JOS. H. KLEIN.